United States Patent [19]

Bähr et al.

[11] 3,983,786

[45] Oct. 5, 1976

[54] METHOD AND APPARATUS FOR REFINISHING GROOVES IN ROLLERS

[75] Inventors: Theodor Bähr; Alfred Hoerner; Heinz Keck, all of Heidenheim, Germany

[73] Assignee: J. M. Voith GmbH, Heidenheim (Brenz), Germany

[22] Filed: Feb. 24, 1975

[21] Appl. No.: 552,630

[30] Foreign Application Priority Data

Mar. 23, 1974 Germany............................ 2414161

[52] U.S. Cl................................ 90/11.42; 90/11.44; 90/15 R
[51] Int. Cl.² ............................................ B23C 3/34
[58] Field of Search .................. 51/95 TG, 101 LG; 90/11.4, 11.42, 11.44, 11.48, 11.64, 11.62, 11.66, 15; 82/25; 83/5, 368, 922, 499, 501, 505

[56] References Cited
UNITED STATES PATENTS

| 2,188,456 | 1/1940 | Galber | 90/11.44 |
| 2,442,065 | 5/1948 | Wainwright | 90/15 |
| 2,609,009 | 9/1952 | Haefliger | 83/368 X |
| 2,792,889 | 5/1957 | Kusel | 83/501 X |
| 3,537,340 | 11/1970 | Westbrook | 83/5 X |
| 3,741,060 | 6/1973 | Owen | 83/368 |
| 3,775,908 | 12/1973 | Meckler | 51/101 LG |

Primary Examiner—J. M. Meister
Assistant Examiner—William R. Briggs
Attorney, Agent, or Firm—Melvin A. Crosby

[57] ABSTRACT

A method and apparatus for refinishing or recutting grooves formed on the outside of rollers, especially rollers employed in paper making machines. The grooves are provided to facilitate drainage of water from a watery web carried by a felt entrained about the grooved roller. The grooves in such rollers can become obstructed by foreign matter and can decrease in depth as the roller wears and must occasionally be refinished or recut to provide for maximum water drainage.

9 Claims, 3 Drawing Figures

METHOD AND APPARATUS FOR REFINISHING GROOVES IN ROLLERS

The present invention relates to a method and apparatus for refinishing and recutting channels, or grooves, formed on rolls employed in papermaking machines and the like.

In the manufacture of paper, a watery suspension of fibers is flowed out from a headbox to a wire and water is drained from the suspension as it is moved away from the headbox on the wire. Following the wire is usually a felt to which the wet paper web is transferred and through which water is expressed from the wet web as by the application of pressure thereto. In order to provide for the free discharge of water from the side of the felt opposite the wet web, there may be provided a roller supporting the felt where the pressure is applied thereto and which roller has peripheral grooves or channels along which the water flows as it is expressed from the paper web through the felt. The grooves can be annular grooves formed in the outer periphery of the roller although, more often, the grooves or channels are in the form of helical channels formed into the roll.

The grooves, or channels, are located in axially spaced relation a distance of only about 3 millimeters from each other and have a width of from about 0.5 to about 0.6 millimeters and a radial depth of about 2.5 millimeters. The grooves, or channels, referred to, are ordinarily formed in the roll by the use of a milling cutter, or a like device, mounted on the slide of an engine lathe in which the roll is rotatably supported, or on the slide of a roll grinding machine.

It has been found that the jacket, or outer periphery, of such a grooved or channeled roll requires that the grooves be reformed at certain intervals because, otherwise, the grooves, or channels, will become too shallow to be highly efficient in carrying away the water, or will become obstructed by fibers and filler material from the suspension. Heretofore, when grooves of the nature referred to became so shallow that they were deficient in serving the purpose for which they were provided, the grooves were removed from the roll by grinding or turning the roll and new grooves were then formed therein utilizing a milling cutter or the like. The grooves were removed from a roll and new grooves placed therein because it has not heretofore been possible to refinish existing grooves in any satisfactory manner.

Experiments which have been undertaken to attempt to recut existing grooves have resulted in the breaking of the milling cutters which, as will be appreciated, are only about 0.5 millimeters thick. Even a slight lateral pressure on a cutter of such thinness prooved to be sufficient to fracture the cutter. The reason that lateral pressure is produced on a cutter which is following an existing groove is that the pitch of a helical groove in a roller embodies a certain amount of inaccuracy so that even the most accurate movement of the cutter along the roll will not maintain the cutter in accurate alignment with the groove to be cut thereby.

Still further, even with accurately formed grooves, the temperature of the roll may differ between the time of originally cutting the grooves and the time of recutting the grooves and this can also create a condition of inaccurate following of the grooves by the cutter, resulting in the breaking of the cutter. Furthermore, in the case of a roll at a different temperature, the grooves being recut would be improperly formed if the cutter did not break because the pitch of the recut grooves would either be greater or lesser than existing grooves.

It will be seen from the foregoing that heretofore it has been extremely difficult to clean and recut the existing grooves with the use of conventional equipment. Thus, in the case of grooves having deposits of fiber material and the like therein, relatively primitive scraping tools were employed and this resulted in the loss of a great deal of time.

The particular object of the present invention is to provide a method and apparatus for cleaning or recutting, or refinishing, grooves, or channels, of the nature aforesaid, which method and apparatus eliminates the problems referred to above.

BRIEF SUMMARY OF THE INVENTION:

According to the present invention, a helically grooved roll, such as a roll for a papermaking machine, has the groove, or grooves, therein cleaned or recut by a rotary milling cutter mounted for movement in the longitudinal direction of the roll while both the roll and the cutter are driven in rotation. The speed of movement of the cutter in the longitudinal direction of the roll is substantially equal to the pitch of the helical groove for each rotation of the roller.

A particular feature of the present invention is the provision of an arrangement for permitting the rotary cutter to move longitudinally, or to 'float,' on the support provided therefor a certain amount so that the cutter disc will follow inaccuracies in the original groove in the roller and thereby eliminate breaking of the cutter disc and, furthermore, eliminating changing of the width of the groove in the roller.

The rotating cutter is mounted on a frame and the frame is movable, or floatable, the aforementioned distance longitudinally on a slide and which slide is caused to traverse the roll from end to end. The slide has limit switches thereon which limit the amount of movement of the cutter support thereon so that any extreme amount of movement of the cutter relative to the slide will result in shutting the machine down until necessary adjustments can be made.

It has been found that, even with the thin milling cutters that must be employed for working grooves of the nature referred to, and in spite of the rather large mass of the support for the milling cutter, the milling cutter will, due to the floating support thereof, withstand lateral forces exerted thereon in following the groove without causing a change in the original groove profile and without breaking the cutter.

The arrangement of the present invention also provides structure useable for positioning the milling cutter initially in the proper position to thread into the groove being cleaned or recut. This increases the speed with which a roll can be treated and eliminates the problems in respect of inserting the cutter into a groove to be cut thereby in the proper position.

When a single helical groove is provided on a roll surface which is to say, a single pitch groove, only a single cutter need be employed for cleaning or cutting the groove. However, when a double or triple groove arrangement is encountered, for example, there would be employed as many cutters as there are starts in the grooving on the roll, for example, for a double grooved roller two cutters would be employed, while for a triple grooved roller three cutters would be employed.

The exact nature of the present invention and the objectives and advantages thereof will become more apparent upon reference to the following detailed specification taken in connection with the accompanying drawings, in which.

Figure 1:
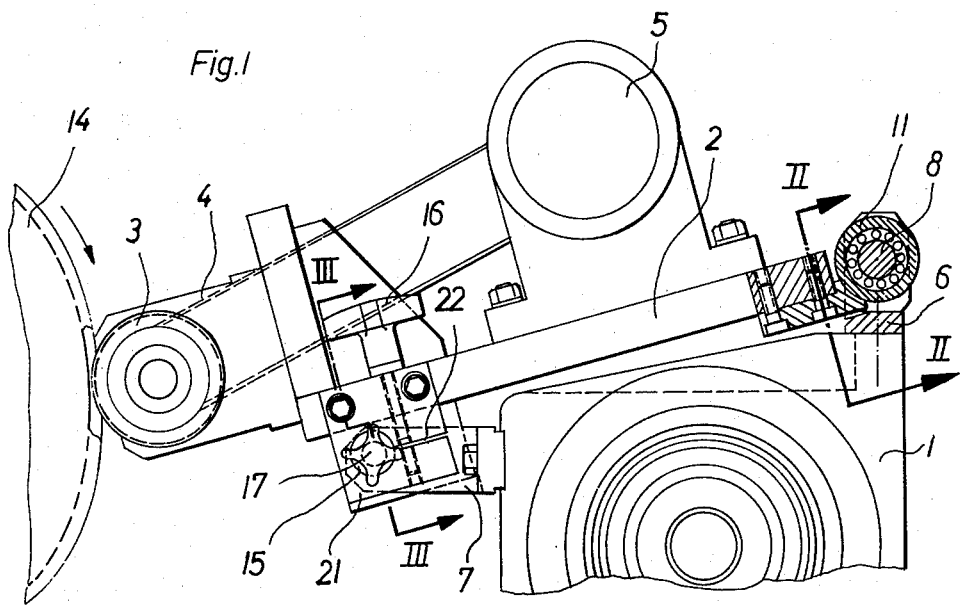
FIG. 1 is a view looking in the axial direction of a roller and showing the supporting mechanism for the cutter disc which is cleaning or cutting the roller grooves.

DETAILED DESCRIPTION OF THE INVENTION:

Referring to the drawings somewhat more in detail, reference numeral 1 represents an extension, or member, forming a part of the spindle assembly or slide of a roll grinding machine. A mounting, or support plate, 2 is provided on which is rotatably mounted a milling cutter 3 which is adapted for being driven in rotation by a belt 4 which is entrained about the output pulley of a motor 5 which is also mounted on support, or mounting, plate 2.

The aforementioned member 1 has rigidly mounted thereon an upper plate member 6 and a lower plate member 7. Plate member 6 has mounted thereon a shaft 8 and plate 7 has mounted thereon a shaft 9. Shafts 8 and 9 are parallel to the axis of the roll being cut and serve as guideways on which mounting, or support plate, 2 is supported by way of bearing ball boxes 10 and 11 in respect of shaft 8, and 12 and 13 in respect of shaft 9. The ball boxes described provide for lateral shifting of mounting or support plate 2 together with cutter disc 3 in the axial direction of the drum being operated under relatively light loading imposed on the sides of the cutter. The aforementioned roll, the grooves, or channels, of which are being cleaned, or recut, is indicated at 14 in FIG. 1.

Figure 3:
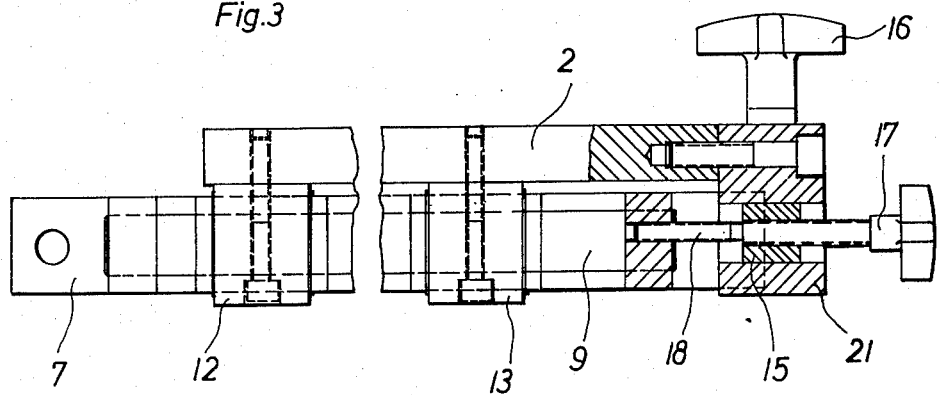
FIG. 3 is a section drawn at enlarged scale and indicated by line III—III on FIG. 1.

As will be seen in FIGS. 1 and 3, the lower plate 7 has the threaded section 18 of a screw 17 threadedly engaged therewith. The screw 17 has a further threaded section which threadedly engages a nut 15. The leads on the threaded section 18 and the threaded section of the screw which engages nut 15 are preferably different. The nut 15 is received in a tubular bore formed in a member 21 which is rigidly connected to mounting or support plate 2. Member 21 has an axial cut therein, indicated at 22, and a clamping, or lock screw, 16 is provided for drawing the member 21 tightly about nut 15 or for permitting nut 15 to move freely in the bore in member 21.

Figure 2:
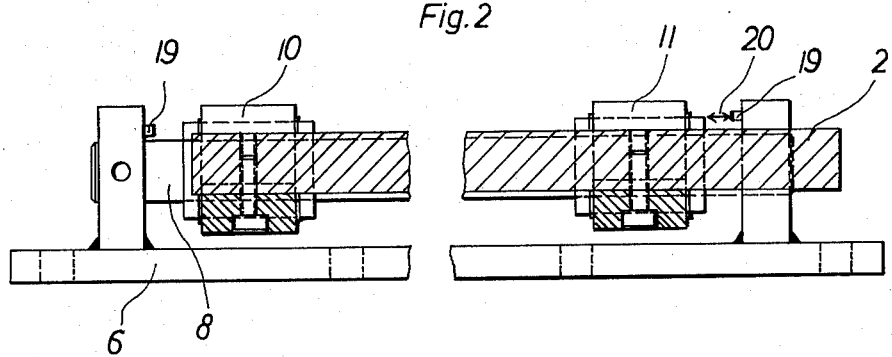
FIG. 2 is a section drawn at somewhat enlarged scale and indicated by line II—II on FIG. 1.

FInally, limit switches 19 are provided which are carried by, for example, plate 6 and which are engageable by elements fixed relative to support plate 2 when support plate 2 moves a predetermined distance in either direction from a centered position relative to member 1. The limit switches are indicated at 19 in FIG. 2 and the permissible movement of mounting, or support plate, 2 from a centered position in either direction is indicated as dimension 20 in FIG. 2.

The described device operates in the following manner. Starting from a selected point outside the axial range of the point at which the milling cutter 3 engages the end of the groove in the roll 14, the spindle assembly including the member 1 is caused to move so that the milling cutter 3 approaches the roll 14 in the axial direction.

As soon as the cutter reaches the groove, or channel, in the roll the operator moves the member 1 with the milling cutter mounted thereon radially toward the roll and engages the cutter disc carefully with the groove to be cut or cleaned. During this adjustment, the operator holds the nut tight in member 21 by clamping it therein by means of lock screw 16. Thus, the precise alignment of the cutter disc with the groove occurs by utilizing adjusting screw 17 and rotation of which, while nut 15 is locked in member 21, will cause support, or mounting, plate 2 to move in the longitudinal direction of member 1.

If it is noted that the first grooves of the roll have not become refinished in the manner desired, the milling cutter is retracted radially and returned to the starting position thereof. If the feed rate of member 1 longitudinally of the roll has been made, as is necessary, to agree with the lead of the grooved roll, the first groove in the roll can be refinished. If the milling cutter 3 runs accurately in the groove track, then the locking screw 16 is loosened up so that nut 15 becomes movable in the bore provided therefor in member 21. The mounting, or support plate, 2 now becomes floatingly supported with respect to plate 6 and 7 and, therefore, member 1 so that the milling cutter may react promptly to fluctuations in the rate of feed, or differences in the lead of the groove and within the range provided by the axial play indicated at 20 in each direction from a centered position of support plate 2 on member 1.

If, for any reason, the permissible axial play 20 is exceeded in either direction, the appropriate limit switch 19 will be actuated which will immediately shut down the operation and prevent damage to the milling cutter, or to the roll 14.

It has been mentioned that the number of cutter discs provided equals the number of independent helical grooves in roll 14 and there may be as many cutters 3 mounted in parallel side by side relation as may be required to cut or clean the grooves of the roll in a single pass when there is more than a single helical groove in the roll surface.

The possibility presents itself of mounting a guide disc coaxially with the cutter disc and of about the same diameter and engaging the guide disc in a portion of the groove which has already been refinished or recut by the cutter disc. In this manner, an additional guiding influence will be exerted on the support thereby relieving the cutter disc from sustaining all of the guiding forces exerted on the support during floating movement thereof.

It will be understood from the foregoing that the main slide is driven, as by a lead screw, to traverse a roll being refinished longitudinally at a speed equal to the lead of the groove being refinished multiplied by the speed of rotation of the drum. With the slide so driven and with the support free to float on the slide, a groove can be recut or refinished or cleaned with a high degree of accuracy in respect of the path of the original groove.

Modifications may be made within the scope of the appended claims.

What is claimed is:

1. In an apparatus for refinishing a helical groove of a grooved roll, especially a roll for a papermaking machine; a slide guided for movement along a path parallel to the axis of a roll and having means for being driven along said path at a speed conforming substantially to the lead of the groove as the roll rotates, a cutter support on the slide adapted to receive a cutter disc which is engageable with the groove of the roll for refinishing the groove, interengaged guide elements on the slide and support guiding said support on said slide for free movement of the support on the slide in a direction parallel to said path, and clamp means operatively interposed between the slide and the support and selectively operable for locking the support to the slide.

2. An apparatus according to claim 1 in which said clamp means is adjustable for adjusting the position of the support on the slide in the direction parallel to said path.

3. An apparatus according to claim 1 in which said guide elements include guide track members on said support parallel to the said path and supporting said support for movement on the side parallel to said path, a screw parallel to said path and threaded in one of said slide and support, a nut also threaded on said screw, and said clamp means comprising means selectively operable for clamping said nut to the other of said slide and support.

4. An apparatus according to claim 1 in which said guide elements include shafts in said slide parallel to said path and in laterally spaced relation and bearing boxes on said support through which said shafts extend, said bearing boxes having antifriction bearings therein engaging said shafts.

5. An apparatus according to claim 1 which includes limit switch means on one of said support and slide and actuating means for the limit switch means on the other of said support and slide, said actuating means being operable to actuate said limit switch means in response to movement of said support on said slide a predetermined amount in either direction from a predetermined relative position of the support on the slide.

6. An apparatus according to claim 1 which includes a member fixed to said support and having a bore parallel to said path, a nut freely slidable in said bore, an adjusting screw parallel to said path and having one threaded portion threadedly engaging said nut and another threaded portion threadedly engaging said slide, said member having a slot parallel to and intersecting said bore, and said clamp means comprising a clamp screw in said member operable for drawing the opposed sides of the slot toward one another to clamp the nut in the member.

7. An apparatus according to claim 6 in which the lead of the thread on said one portion of said adjusting screw is different from the lead of the thread on said other portion thereof.

8. A method of refinishing a helical groove in a roll which comprises; supporting a slide for movement along a path parallel to the axis of the roll, mounting a support on the slide for free floating movement thereon within predetermined limits in a direction parallel to said path, mounting a cutter on the support, engaging the cutter in the groove to refinish the groove during rotation of the roll, rotating the roll, driving the slide along said path at a speed substantially equal to the lead of the groove multiplied by the speed of rotation of the roll while permitting the support to float on said slide in a direction parallel to said path, detecting when said support moves on said slide to one of said predetermined limits, and halting said slide when said support moves thereon to one of said predetermined limits.

9. The method according to claim 8 which includes connecting the support to the slide prior to a refinishing operation, adjusting the support on the slide to align the cutter with the groove, and releasing the support from the slide for floating movement of the support on the slide during a refinishing operation.

* * * * *